United States Patent [19]

Pritulsky

[11] E Re. 29,223

[45] Reissued May 17, 1977

[54] ZERO INSERTION FORCE CONNECTOR

[75] Inventor: James Pritulsky, Harrisburg, Pa.

[73] Assignee: AMP Incorporated, Harrisburg, Pa.

[22] Filed: Mar. 15, 1976

[21] Appl. No.: 666,718

Related U.S. Patent Documents

Reissue of:

[64] Patent No.: 3,897,991
Issued: Aug. 5, 1975
Appl. No.: 442,955
Filed: Feb. 15, 1974

[52] U.S. Cl. ..... 339/75 MP; 339/176 MP
[51] Int. Cl.[2] ..... H01R 13/62
[58] Field of Search ..... 339/17 R, 17 L, 17 LM, 339/74 R, 75 R, 75 M, 75 MP, 176 R, 176 M, 176 MP

[56] References Cited

UNITED STATES PATENTS

| | | | |
|---|---|---|---|
| 3,475,717 | 10/1969 | Lane | 339/75 MP |
| 3,555,488 | 1/1971 | McIver et al. | 339/75 MP |
| 3,596,230 | 7/1971 | Ecker | 339/176 MP |
| 3,665,370 | 5/1972 | Hartmann | 339/75 MP |
| 3,818,419 | 6/1974 | Crane | 339/74 R |
| 3,820,054 | 6/1974 | Clewes et al. | 339/75 M |

*Primary Examiner*—Roy Lake
*Assistant Examiner*—Neil Abrams
*Attorney, Agent, or Firm*—William J. Keating, Esq.; Donald W. Phillion, Esq.

[57] ABSTRACT

A thin, board-to-board zero force insertion and withdrawal connector having a housing containing a plurality of contacts with a first end portion of the contacts secured therein. A pair of parallel rows of rib-like elements extend along the length of the housing and define a U-shaped slot into which the edge of a circuit board can be inserted. The ribs form grooves therebetween which are perpendicular to the rows of ribs. The other end portion of each of said contacts extends downwardly into a groove towards the inner sides of said rib-like elements defining a side of said U-shaped slot, and then further extends upwardly towards the outer side of said rib-like elements. A plate is positioned along the length of said housing and secured thereto by a flexible hinge which divides the plate longitudinally along its length into two sections. A first of these sections extends over the said other end portions of said contacts. The other section of said plate has inclined planes formed on the inner surfaces thereof. A flat strip of material, which also has inclined planes on one surface thereof, fits in-between said second section of said plate and said housing, with the inclined plane surfaces mated to each other. By moving the flat strip in a first direction the said plate is pivoted about its flexible hinge so that said first section thereof forces the said other end portions of said contacts down into said U-shaped slot and against the edge of a circuit board inserted therein.

24 Claims, 3 Drawing Figures

ZERO INSERTION FORCE CONNECTOR

Matter enclosed in heavy brackets[ ] appears in the original patent but forms no part of this reissue specification; matter printed in italics indicates the additions made by reissue.

BACKGROUND OF THE INVENTION

This invention relates generally to connectors which connect one circuit board to another circuit board and more particularly to board-to-board connectors which have substantially zero insertion and withdrawal forces and which also have relatively small width dimensions, thereby allowing close spacing of a plurality of parallel daughter boards which are connected to a common, perpendicularly positioned mother board.

The general concept of positioning several parallel daughter boards to a commmon perpendicular mother board is well known in the art. One of the primary problems involved in connecting one circuit board to another circuit board through a connector is the insertion and withdrawal forces required for such connections and disconnections. In cases where the daughter board has a large number of edge contacts, the cumulative insertion or withdrawal force can become quite large, totalling many tenths of pounds.

Since such high insertion or withdrawal forces present obvious problems, such as strain on the mother board and also possible damage to each of the individual contacts of the daughter board, much effort has been expended in developing what is known as zero force insertion and withdrawal connectors. Most of these zero force insertion and withdrawal connectors have some type of cam or lever arrangement which, in one position, causes the contacts within the connector to spread apart, or at least retreat from the mating contacts on the edge of the board being inserted therein. After the circuit board is inserted, the lever or cam is manually operated to cause the contacts within the connector to be forced down upon the mating contacts on the edge of the inserted printed circuit board.

Such mechanisms are usually quite complex and fairly large so that parallel positioned daughter boards must be spaced relatively far apart upon the common perpendicular mother board.

In modern electronic circuit packaging it is highly desirable to space parallel daughter boards as close together as possible upon a common mother board in order to provide a smaller overall package.

BRIEF STATEMENT OF THE INVENTION

It is a primary object of the invention to provide a board-to-board zero force insertion and withdrawal connector having a relatively thin width, thereby permitting close spacing of parallel positioned daughter boards upon a common, perpendicular mother board.

A second purpose of the invention is to provide a zero insertion and withdrawal board-to-board connector in which the zero force insertion and withdrawal enabling means requires a minimum of operating space, thereby allowing relatively close spacing of parallel daughter boards on a common mother board.

It is a third object of the invention to provide a relatively zero force insertion and withdrawal board-to-board connector which does not utilize cams or levers, but rather utilizes a series of mated inclined planes which are movable with respect to each other and which result in a thinner connector, thereby allowing closer spacing of parallel daughter boards to a common perpendicular mother board than has heretofore been possible.

A fourth purpose of the invention is the improvement of zero force insertion and withdrawal circuit board connectors generally.

In accordance with the invention the board-to-board connector comprises an electrically insulative housing having a plurality of contacts securely retained therein. The housing consists of a first elongated main portion having a pair of parallel ledges extending along the length thereof, which ledges define a U-shaped slot for receiving the edge of a circuit board insertable therein. At least one of these two ledges comprises a plurality of parallel ribs which form grooves therebetween, which grooves are perpendicular to the ledges.

Each of the contacts has one end portion thereof secured in the main portion of the housing, and the other end portion thereof extending freely into one of said grooves and configured to have a section thereof extending towards the inner sides of the ribs which define one side of said U-shaped slot and then extending away from said slot and towards the outer sides of the ribs. An elongated plate is positioned along the length of said housing and is secured to the side of the housing by a hinge-like means which extends along the plate between the housing and the plate and divides said plate longitudinally into first and second sections, with the first section extending over the said other ends of the contacts and the second section having its inner surface formed into at least one inclined plane which extends longitudinally along said plate.

An actuator means, which is essentially a flat strip of plastic with a major surface formed into at least one inclined plane configured to mate with the inclined plane surface of said plate, is inserted in between the main portion of said housing and the second section of said plate. When said flat strip is moved longitudinally in a first direction it will cause said mated inclined plane surfaces to move with respect to each other, thereby pivoting the said plate about the hinge-like means to cause said first section thereof to press down upon the said other end portions of the contacts, thereby actuating said other end portions of the contacts down into said slot and against mating contacts on the edge of the circuit board inserted therein.

When the flat strip is moved longitudinally in the opposite direction, the said second section of said plate is pivoted away from said other end portions of said contacts to release the pressure between said other end portions of said contacts and the circuit board inserted in the slot to permit removal or insertion of said circuit board with substantially zero force.

*In accordance with a basic feature of the invention the inclined plane formed on the flat strip actuator means and the inclined plane formed on the elongated plate which is flexibly secured to the main portion of the housing, cooperate to pivot the elongated plate and thereby move the portion of the contacts extending out of the main portion of the housing. Since the length of the mating inclined planes is independent of the spacing between adjacent pairs of contacts, such inclined planes can each have a length greater than the distance between adjacent contacts, thereby providing a selectable me-*

*chanical advantage in that the force required to move said actuator means back and forth to actuate the contacts can be reduced or increased merely by increasing or decreasing the length of the inclined planes and decreasing or increasing the slope thereof. The back and forth excursion distance of the actuator means will then vary inversely as the force required to move said actuator means varies.*

BRIEF DESCRIPTION OF THE DRAWINGS

The above-mentioned and other objects and features of the invention will be more fully understood from the following detailed description thereof when read in conjunction with the drawings in which.

DETAILED DESCRIPTION OF THE INVENTION

Figure 1:
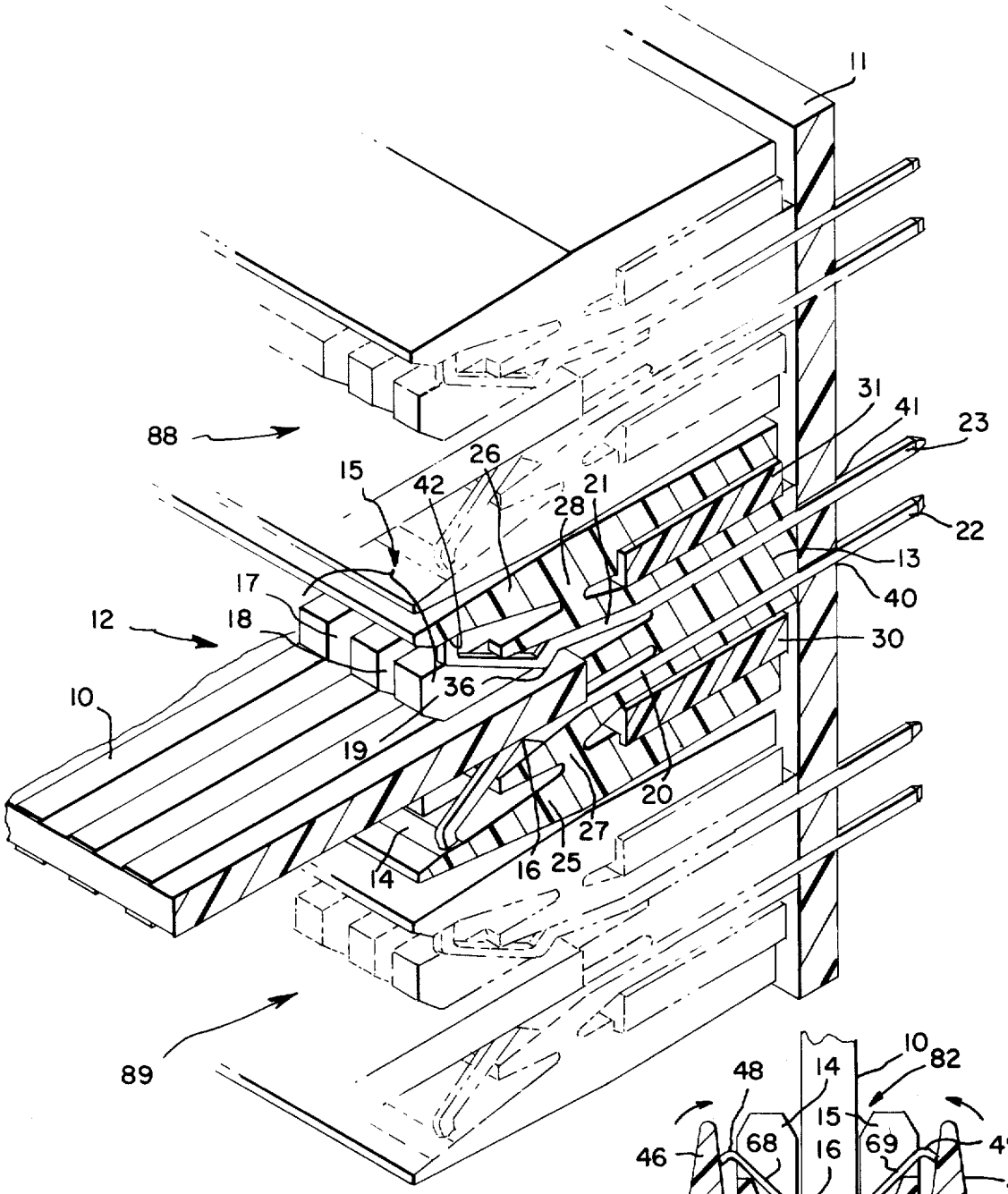
FIG. 1 is a perspective, cross-sectional view of the connector of the invention showing in detail how a daughter board is connected to a mother board thereby.

Referring now to FIG. 1, a daughter board 10 is shown connected to a mother board 11 through the connector of the invention, denoted generally by reference character 12.

Basically, connector 12 consists of a housing comprised of four main portions and a plurality of contacts retained therein. The first housing portion, designated herein as the main portion of the housing, is identified by reference character 13, and includes that portion of the connector housing in which the retained contacts, such as contacts 20 and 21, are secured.

It is to be noted that only a portion, i.e., the center portion, of the contacts are secured in main portion 13 of the housing. For purposes of description herein, this center portion of the contacts 20 and 21 is defined in the specification and in the claims as the first end portion of the contacts.

Actually, however, the two contacts 20 and 21 extend through and out the end of the main portion 13 of the connector housing to form terminal posts designated generally by reference characters 22 and 23 and which fit through apertures 40 and 41 provided therefore in the mother board 11.

The second portion of the connector 12 consists of two rows of ribs, designated generally as 14 and 15 in FIG. 1, and which extend along the entire length of housing 12 and define a U-shaped groove thereinbetween into which the daughter board 10 is inserted, as shown in FIG. 1.

The third portion of the connector housing 12 consists of the two plates 25 and 26 which are secured to the main portion of the housing by means of flexible hinge-like elements 27 and 28, respectively. These flexible hinge-like elements 27 and 28 are in fact hinges about which the plates 25 and 26 can pivot.

The last of the four main portions of connector housing 12 consists of the two flat strips 30 and 31, of which only the ends can be seen in FIG. 1. The flat strips 30 and 31 are shown in more detail in FIG. 3 and can be seen to have one surface which is essentially a series of iterative inclined planes which mate with mirrored iterative inclined planes in the associated plate 25.

Figure 3:
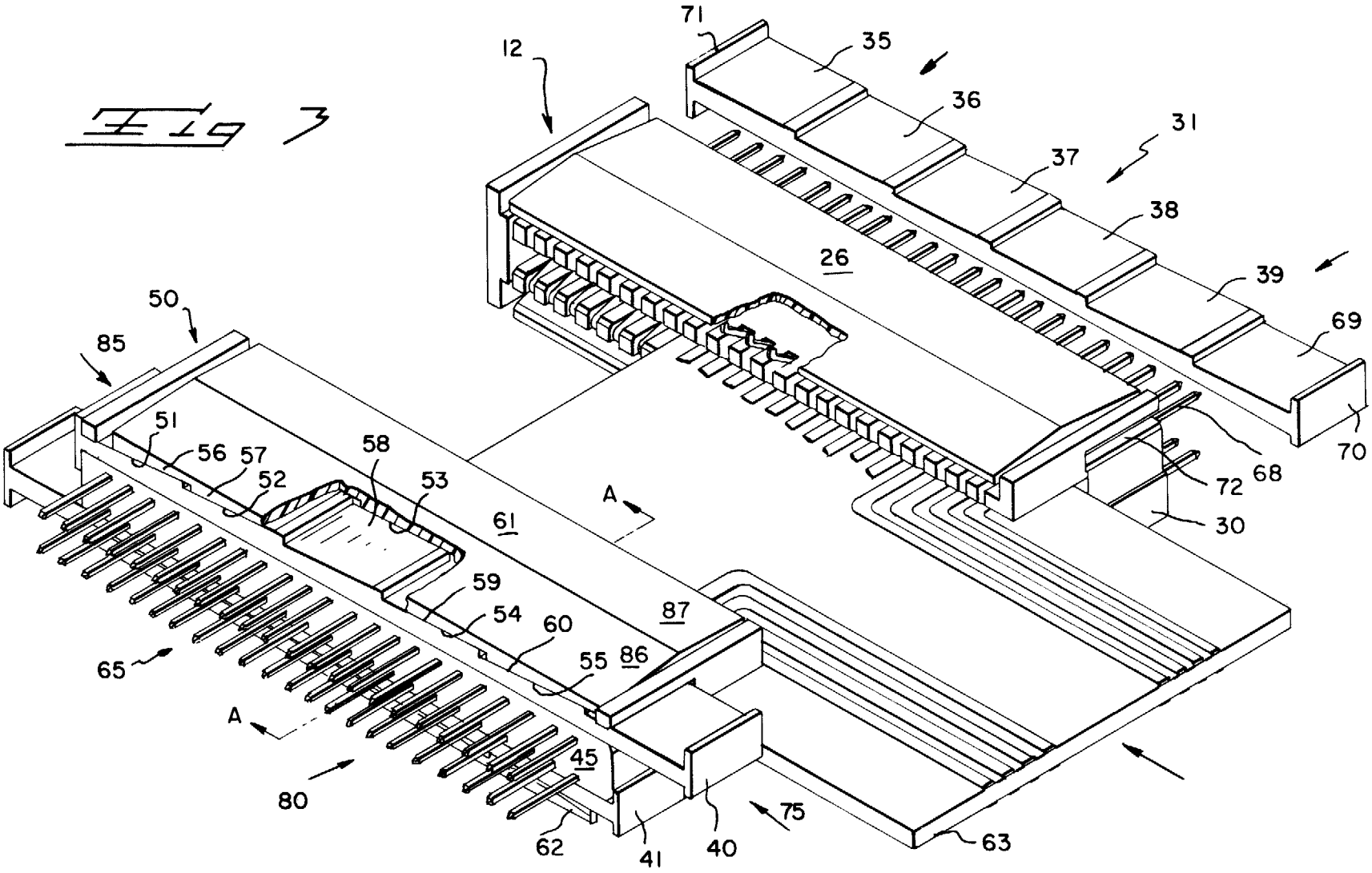
FIG. 3 is a perspective view of a combination structure showing how a single daughter board can be connected to two mother boards through the use of two of the connectors of the present invention.

While the mating of the inclined planes in plate 26 and flat strip 31 cannot be seen in FIG. 3, a corresponding mating of inclined planes in a similar connector 50, also shown in FIG. 3, can be seen. More specifically, the inclined planes 51, 52, 53, 54 and 55 of flat strip 40 and the mating and mirrored inclined planes 56, 57, 58, 59 and 60 of plate 61, which corresponds to plate 26 in connector 12, can be seen in FIG. 3.

Returning again to FIG. 1, the contacts, such as the pair of contacts 20 and 21, can be seen. The center portion thereof of the contacts 20 and 21, also called the first end portion, is securely retained within the main portion 13 of connector 12, as has already been discussed. The other end portion, that is the free end portion of the contacts 20 and 21 to the left of the first end portion in FIG. 1, extends into the grooves between the ribs of the row of ribs 14. Such grooves are designated, for example, by reference characters 17, 18 and 19 in FIG. 1. The internal configuration of one of these grooves is shown best by the groove represented by reference character 19. It can be seen that the free or other end portion of the contact 21, i.e., the left hand portion of the contact 21, extends into the groove 19 and then has a bent-down or convex section designated generally by reference character 36, which extends nearly to the inner sides of the row of ribs 15, which inner sides define one edge of the main slot into which the edge of the daughter board 10 can be inserted.

The said free or other end portion of contact 21 then extends further towards the outside tip of the row of ribs and upwardly towards the plate 26 and, in fact, extends beyond the outer sides of the row of ribs 15 and comes very close to or can actually make contact with the inner surface of the overhanging portion of the plate 26, as shown in FIG. 1 at point 42.

As mentioned above, the plate 25 and also the plate 26 pivot about the flexible hinges 27 and 28, respectively. For purposes of discussion, however, only plate 25 and its pivoting action around hinge 27 will be discussed herein since its action is the same as the pivoting action of plate 26 around its hinge 28.

It is apparent that if the plate 25 is pivoted in a clockwise direction around hinge 27, the left hand section of plate 25 will bear up upon the ends of the contacts, such as contact 20, and will force the convex portion 16 thereof into firm contact with the edge of the daughter circuit board 10, which has previously been inserted into slot 82 (see FIG. 2) of connector 12 with zero insertion force.

The means by which the plate 25 is caused to pivot around hinge 27 is flat strip 30 which has inclined plane portions thereon similar to the inclined planes 35 and 39 which are shown on strip 31 of FIG. 3.

For purposes of clarity of description of the foregoing consider the flat strip 40 and the plate 61 shown in FIG. 3, which correspond precisely to the flat strip 30 and the plate 25 of FIG. 1, but which show more clearly the relationship therebetween.

The flat strip 40 is first inserted in a lateral or transverse manner in the direction of the arrow 80 in the gap between plate 61 and the side of the main portion 45 of the connector 50. The strip 40 is initially inserted in such a manner that the inclined planes 51 – 55 of the strip 40 and the inclined plates 56 – 60 mate completely with each other over their full surfaces. Thus, for example, the inclined plane or ramp 51 mates substantially over its entire surface with the mating ramp or inclined surface 56 of plate 61.

If now the flat strip 40 is moved to the left in FIG. 3, in the direction of arrow 75, it is apparent that the corresponding inclined plane will ride up each other, thereby pushing the left hand section 86 of plate 61 upwardly and the right hand section 87 downwardly upon the contacts which lie within the connector 50, but which are not shown.

The lower flat strip 41 of connector 50 is shown as being in its actuated position so that plate 62 has been pivoted about its flexible hinge (not shown) and the lower band of contacts (also not shown) have been brought to bear firmly against the underside of the daughter board 63.

Once the flat strips are inserted in the connector, such as connector 50, and are either in their non-actuated condition or their actuated condition, the connector 50 can be attached to the mother board by means of the bank of post-like terminals 65, as shown in FIG. 3. Subsequently, the daughter board 63 can be either inserted and withdrawn with substantially zero force simply by manual operation of the two flat strips 40 and 41 into their actuated and non-actuated positions.

Figure 2:
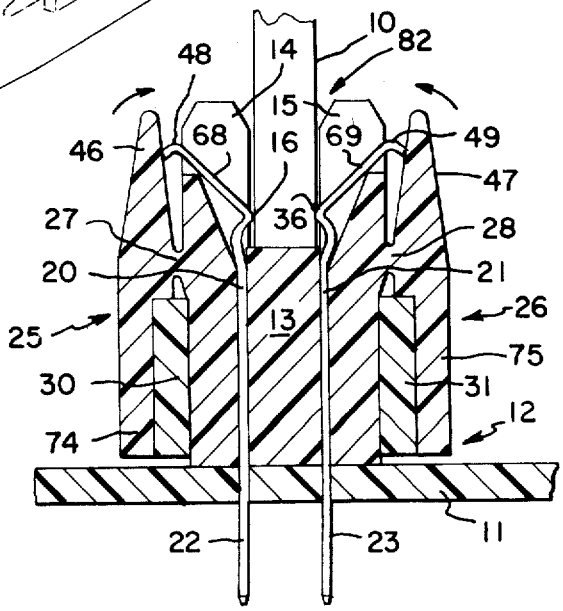
FIG. 2 is a plan view of a cross-section of the connector, and also shows how a daughter board is connected to a mother board.

Reference is made to FIG. 2 which shows even more clearly the interaction between the flat strips 30 and 31, the plates 25 and 26 and the contacts 20 and 21. More specifically, in FIG. 2 the plates 30 and 31 are shown in their actuated positions so that the portions 46 and 47 of the plates 25 and 26 are pivoted towards and into the end portions 48 and 49 of contacts 20 and 21 about flexible hinges 27 and 28 respectively.

More specifically consider the plate 25 individually. The flat strip 31 is shown in its actuated position, thereby pushing the section 46 of plate 25 against the end portion 48 of contact 20. The contact portion 16 of contact 20 moves freely within the grooved area between adjacent ribs, of which rib 14 is shown, and is forced into the edge of the daughter board 10. Presumably, a contact will be present on the edge of daughter board 10 at the point into which the section 16 of contact 20 is forced, thereby making good electrical contact with the daughter board 10. Also, a mechanical gripping of the mother board within the connector 12 is effected by means of contact 20 being forced against said daughter board 10.

If it is desired to remove the daughter board 10 from connector 12 it is only necessary that the flat actuator strips 30 and 31 be moved to their non-actuated positions, thereby pivoting the portions 46 and 47 of plates 25 and 26 outwardly and away from the ends 48 and 49 of the contacts 20 and 21. The convex portions 16 and 36 of contacts 20 and 21 thereby move away from daughter board 10 and release the pressure therefrom to allow removal of said daughter board 10 from the slot 82 with substantially zero force.

Referring again to FIG. 3 there is shown a structure whereby a single daughter board 63 can be connected to two mother boards (not shown) through connectors 12 and 50 respectively. One of the mother boards can be connected to the array of post-like terminals 65 on connector 50, and the other mother board can be connected to the post-like terminals, such as post terminal 68 of connector 12.

It is further to be understood that the plurality of daughter boards, such as daughter board 63 can be stacked, one upon the other in parallel manner, with each daughter board being connected to one or both of the two mother boards. Thus, in FIG. 1, connectors 12, 88 and 89 can be positioned side-by-side on each mother board so that the spacing between the daughter board is equal substantially to the thickness of the connectors 12 and 88. In one practical form of the invention which actually has been constructed, the connectors 12 and 88 are each slightly less than one-half inch thick so that daughter boards 10 can be stacked in parallel manner approximately one-half inch apart.

Referring now specifically to some details of the flat strip 31 of FIG. 3, it can be seen that such flat strip 31 has two end plates 70 and 71 which function as a means for moving the flat strip back and forth in the connector 12 and also function as stops so that the flat strip 31 can move in either direction only to the point to where the end plates 70 and 71 abut against the end of the connector 12.

It is not necessary that the portion 69 of the flat strip 31 be an inclined plane since it simply represents that portion of the length of the flat strip 31 which extends out of the connector 12 when the flat strip 31 is in its non-actuated condition. More specifically, the section 69 permits the flat strip 31 to be moved back and forth and is not a part of the inclined plane surfaces which pivots the plane 26 about its flexible hinge 28.

*It will be noted that the length of the inclined planes 51 through 55 of the slidable flat strip actuating means 40 and the mating inclined planes 56 through 60 of the plate 61 are independent of the distance between the contacts 65. Thus, the force required to move the flat strip actuating means 40 back and forth to cause the inclined planes 51–55 to ride up and down the inclined planes 56–60 can be reduced by increasing the length of the inclined planes 51–55 and 56–60 and decreasing the slope thereof. Such a change in length and slope of the inclined planes 51–55 and 56–60 will result in a greater longitudinal movement of the actuating means 40 in order to actuate the contacts as discussed above in connection with FIGS. 1 and 2, but will also result in a smaller force required to move the flat strip 40 longitudinally.*

The connector 12 is provided with slots in the ends thereof, such as slot 72 so that the flat strip 31 can be inserted in between the plate 26 and the main portion of the housing before the connector is secured to the mother board by means of post-like terminals 68.

It is to be understood that the form of the invention shown and described herein is but a preferred embodiment thereof, and that various changes, such as for example, the number of inclined surfaces on the flat strips and the pivoting plates, or the particular configuration of the contacts, can be made without departing from the spirit or scope of the invention.

What is claimed is:

1. A circuit board connector comprising a housing and a plurality of contacts retained therein;

said housing comprising a first elongated main portion having a pair of parallel ledges extending along the length thereof with their inner surfaces defining a slot to receive the edge of a first circuit board therein;

at least one of said ledges comprising a plurality of ribs forming parallel grooves therebetween which are perpendicular to said ledges;

each of said plurality of contacts having a first end portion thereof secured in said main portion of said housing and the other end portion thereof extending into one of said grooves and configured to have a section thereof extending towards the inner surface of said ledge which defines one side of said slot and with the end of said other end portion extending away from said slot and towards the outer surface of said ledge;

said housing further comprising an elongated plate extending along the length of said housing and secured to said housing by a flexible, hinge-like element which extends along at least a portion of the length of said housing and is parallel to the center line of said elongated plate;

a first section of said plate on one side of said hinge-like element extending over the said other ends of said contacts;

a second section of said plate on the other side of said hinge-like element having its inner surface comprising a series of inclined planes extending longitudinally along said plate; and an actuator means comprising an elongated flat strip with one of its two major surfaces formed into a series of inclined planes configured to mate with the inclined planes on said plate;

said flat strip insertable in between said main portion of said housing and said second section of said plate, and movable longitudinally in a first direction to cause said mated inclined planes to move with respect to each other, thereby pivoting the said plate about said hinge-like means to cause said first section of said plate to press down upon the ends of said other end portions of said contacts and thereby actuate said sections of said contacts down into said slot and against mating contacts provided on the edge of said circuit board inserted in said slot.

2. A circuit board connector in accordance with claim 1 in which said flat strip is movable in a second direction to release the pressure of said first section of said plate upon said ends of said other end portions of said contacts to enable withdrawal of said first circuit board from said slot with substantially zero force.

3. A circuit board connector in accordance with claim 1 in which the said other end portion of each of said contacts has a section thereof which is convex with respect to the inner surface of said ribs on said ledge which defines said slot and which extends, when not actuated, inwardly towards the inner surface of said ledge ribs which define said slot, but not into said slot to an extent which will impede the insertion of the edge of said first circuit board.

4. A circuit board connector in accordance with claim 1 in which said first end portions of said contacts extend through said main portion of said housing to form terminals which fit into mating terminals contained in a second circuit board, thereby forming a first circuit board to second circuit board connection.

5. A zero entry force circuit board connector comprising a housing and a plurality of contacts retained therein;

said housing comprising a first elongated main portion having at least one row of parallel ribs extending along the length thereof and a ledge extending along the length thereof;

said row of parallel ribs and said ledge defining an elongated slot therebetween to receive the edge of a circuit board therein;

said row of ribs forming grooves therebetween which are substantially normal to the longitudinal direction of said elongated slot;

each of said plurality of contacts having one end portion thereof secured in said main portion of said housing and the other end portion thereof extending into one of said grooves and configured to have a section thereof extend towards the inner sides of said ribs which define one side of said slot, and with the end of said other end portion extending away from said slot and towards the outer sides of said ribs;

an elongated plate extending along the length of said housing and secured near its midpoint to the outside surface of said housing by a hinge-like means extending along a line which divides said elongated plate longitudinally into first and second sections;

said first section extending over the said other ends of said contacts;

said second section having its inner surface comprising at least one inclined plane surface extending longitudinally along said elongated plate; and an actuator means comprising an elongated flat strip with a major surface formed into at least one inclined plane surface configured to mate with the inclined plane surface of said plate;

said flat strip being insertable in between said main portion of said housing and said second section of said plate, and movable longitudinally in a first direction to cause said mated inclined plane surfaces to move with respect to each other and thereby pivot the said plate about said hinge-like means to cause said first section thereof to press down upon said ends of said other end portions of said contacts and thereby actuate said other end portions of said contacts down into said slot and against mating contacts on the edge of said circuit board inserted therein.

6. A circuit board connector in accordance with claim 5 in which said flat strip is movable in a second direction to release the pressure of said first section of said plate upon said ends of said other end portions of said contacts to enable withdrawal of said circuit board from said slot with substantiallly zero force.

7. A circuit board connector in accordance with claim 5 in which the said other end portion of each of said contacts has a section thereof which is convex with respect to the inner surface of said ribs on said ledge which define said slot and which extends, when not actuated, inwardly towards the inner sides of said ribs which define said slot, but not into said slot to any extent which would impede the insertion of the edge of said circuit board therein.

8. A circuit board connector in accordance with claim 5 in which said first end portions of said contacts extend through said main portions of said housings to form terminals which fit into mating terminals contained in a second circuit board, thereby forming a circuit board to circuit board connection.

9. A circuit board connector comprising a housing and a plurality of contacts retained therein;

said housing comprising a first elongated main portion having a pair of rows of parallel ribs extending along the length thereof and defining an elongated slot therebetween to receive the edge of a cricuit board therein;

said ribs of each row forming grooves therebetween which are perpendicular to the longitudinal direction of said elongated slot;

each of said plurality of contacts having one end portion thereof secured in said main portion of said housing and the other end portion thereof configured to extend into one of said grooves towards the sides of said ribs which define one side of said slot, and then to extend away from said slot and towards the other sides of said ribs;

an elongated plate extending along the length of said housing and secured to the side of said housing by a hinge-like means extending along a line which divides said elongated plate longitudinally into first and second sections;

said first section extending over the said other end portions of said contacts;

said second section having its inner surface comprising at least one inclined plane extending longitudinally along said plate; and an actuator means comprising an elongated flat strip with a major surface formed into at least one inclined plane configured to mate with the inclined plane surface of said plate;

said flat strip being insertable in between said main portion of said housing and said second section of said plate, and movable longitudinally in a first direction to cause said mated inclined plane surfaces to move with respect to each other and thereby pivot the said plate about said hinge-like means and cause said first section to press down upon said other end portions of said contacts and thereby actuate said contacts down into said slot and against mating contacts on the edge of said circuit board inserted therein.

10. A circuit board connector in accordance with claim 9 in which said flat strip is movable in a second direction to release the pressure of said first section of said plate upon said other end portions of said contacts to enable withdrawal of said circuit board from said slot with substantially zero force.

11. A circuit board connector in accordance with claim 9 in which the said other end portion of each of said contacts has a section thereof which is convex with respect to the inner surface of said ribs which define said slots and which extends, when not actuated, inwardly towards the inner sides of said ribs which define said slot, but not into said slot to any extent which impedes the insertion of the edge of said circuit board.

12. A circuit board connector in accordance with claim 9 in which said first end portions of said contacts extend through said main portions of said housings to form terminals which fit into mating terminals contained in a second circuit board, thereby forming a circuit board to circuit board connection.

13. A zero entry force circuit board connector comprising a housing and a plurality of contacts retained therein;

said housing comprising a first elongated main portion having at least one row of parallel ribs extending along the length thereof and a ledge extending along the length thereof;

said row of parallel ribs and said ledge defining an elongated slot therebetween to receive the edge of a circuit board therein;

said ribs forming grooves therebetween which are substantially normal to the longitudinal direction of said elongated slot;

each of said plurality of contacts having one end portion thereof secured in said main portion of said housing and the other end portion thereof extending into one of said grooves towards the sides of said ribs which define one side of said slot and then extending away from said slot and towards the outer sides of said ribs;

an elongated plate extending along the length of said housing and secured to the side of said housing by a hinge-like means extending along a line which divides said elongated plate longitudinally into first and second sections;

said first section extending over the said other end portions of said contacts;

said second section having its inner surface comprising at least one inclined plane extending longitudinally along said plate; and an actuator means comprising an elongated flat strip with a major surface formed into at least one inclined plane configured to mate with the inclined plane surface of said plate;

said flat strip being insertable in between said main portion of said housing and said second section of said plate, and movable longitudinally in a first direction to cause said mated inclined plane surfaces to move with respect to each other and thereby pivot the said plate about said hinge-like means to cause said first section to press down upon said other end portions of said contacts and thereby actuate said other end portions of said contacts down into said slot and against mating contacts on the edge of said circuit board inserted therein.

*14. A zero entry force connector for connecting to a plurality of external terminals positioned on the edge of a supporting member comprising:*

*a housing having an elongated base portion;*

*a plurality of contacts each having a first portion having a supporting member engaging portion, and a housing engaging portion connected to said first portion and arranged in first and second parallel rows to form a single row of pairs of said contacts with the housing engaging portions of each pair being mounted in said base portion and with their first portions extending out of said housing base and having their supporting member engaging portions facing each other;*

*said housing comprising first and second strip means pivotally connected to said elongated base portion and bearing against said first portion of said contacts;*

*said first and second strip means attached to said housing base portion on opposite sides thereof and parallel to said first and second rows of contacts, and having formed on facing surfaces thereof first and second rods of ramps of similar first slope and separated by first shoulders; and*

*actuator means comprising third strip means supported by said first and second strip means and said housing base portion and having third and fourth rows of ramps of slope similar to said first slope and separated by second shoulders, formed on surfaces thereof which face away from each other;*

*said actuator means being positioned between said first and second rows of ramps with said third and fourth rows of ramps mating with said first and second rows of ramps, respectively;*

*said actuator means further constructed to move longitudinally with respect to said rows of ramps to cause the ramps of said mated rows of ramps to ride up and down each other to pivot said first and second strip means about their pivotal connections to said hous-*

*ing base portion to increase or decrease the distance between the contacts of each pair of contacts.*

*15. A zero entry force connector as in claim 14 in which the length of each ramp is greater than the distance between adjacent contacts in said rows of contacts.*

*16. A zero entry force connector as in claim 15 in which said housing has a slot formed therein for receiving said second external terminals between the contacts of each pair of contacts in said rows of contacts, with said slot being continuous through at least one end of said housing.*

*17. A connector for connecting a plurality of first external terminals to a plurality of second external terminals on the edge of a substrate comprising:*

*an insulative housing having an elongated base portion;*

*a plurality of contacts each having a bowed portion and a center portion connected to said bowed portion;*

*said plurality of contacts arranged in a row of pairs of said contacts with the contacts of each pair having their center portions mounted in said housing base and with the convex sides of their bowed portions facing each other;*

*said insulative housing comprising first elongated strip means pivotally secured along the length of said elongated base portion and having at least a portion thereof bearing against a portion of the bowed portions of the contacts of each row of contacts;*

*said first elongated strip means having first similarly formed first inclined planes separated by shoulders spaced apart a given distance, formed on each of two facing surfaces thereon and extending along the length thereof; and*

*actuator means comprising second elongated strip means having a series of protuberances spaced apart said given distance formed on each of two surfaces thereon which face away from each other and extending along the length thereof;*

*said actuator means being positioned between said two surfaces containing said first inclined planes, with said series of protuberances mating with said first inclined planes;*

*said actuator constructed to be moveable along its longitudinal direction to cause said protuberances to ride up and down said first inclined planes to increase or decrease the distance between the contacts of each pair of contacts.*

*18. A connector as in claim 17 in which said series of protuberances comprise second inclined planes formed on said two surfaces which face away from each other every given distance with said second inclined planes being similar to said first inclined planes.*

*19. A connector as in claim 18 in which the length of each inclined plane is greater than the distance between adjacent contacts in said rows of contacts.*

*20. A connector as in claim 19 in which said insulative housing means has a substrate edge receiving slot formed therein along the length thereof between the contacts of each pair of contacts and being continuous through at least one end of said insulative housing means.*

*21. A zero entry force connector for connecting to a plurality of external terminals secured on a supporting member in at least one row and comprising:*

*a housing comprising an elongated base portion;*

*a plurality of contacts each having a first portion having an external terminal engaging section, and a second portion for engaging said housing base portion connected to said first portion, and arranged in a row on said housing base portion with the second portions of each pair being mounted in said housing base portion, and having their first portions extending from said housing base portions with their external terminal engaging sections facing in a first direction;*

*said housing further comprising first elongated strip means flexibly secured along the length of said elongated base portion and bearing against said first portions of said contacts;*

*said first elongated strip means having formed thereon and along the length thereof a row of raised areas spaced apart a given distance; and*

*actuator means comprising second elongated strip means having formed thereon and along the length thereof a first row of inclined surfaces and separated by shoulders spaced apart said given distance;*

*said actuator means being supported by said elongated base portion and said first elongated strip means to have its said row of inclined surfaces matably engaged with said row of raised areas;*

*said actuator means further constructed to be moveable longitudinally along its length to cause said row of inclined surfaces to ride up and down said row of raised areas to move the second external terminal engaging portions of said contacts transversely to the longitudinal movement of said actuator means.*

*22. A zero entry force connector as in claim 21 in which said row of raised areas comprise a second row of inclined surfaces substantially the same as said first row of inclined surfaces and matably engageable with said first row of inclined surfaces.*

*23. A zero entry force connector for connecting to a plurality of external terminals secured on a supporting member in at least one row and comprising:*

*a housing comprising an elongated base portion and side walls;*

*a plurality of contacts each having a first portion having an external terminal engaging section, and a second portion for engaging said housing base portion connected to said first portion and arranged in a row on said housing base portion;*

*the second portions of each pair of contacts being mounted in said housing base portion with their external terminals engaging sections extending from said housing base portions and facing in a first direction;*

*said housing further comprising first elongated strip means flexibly secured along its length to the length of said elongated base portion with a first surface thereof facing a first of said side walls and which further bears against said first portions of said contacts;*

*said first surface of said elongated strip means or said first side wall having formed thereon and along the length thereof a first row of similarly shaped inclined surfaces separated by first shoulders spaced apart a given distance to collectively form a sawtooth-like profile along the length of said first elongated strip means; and*

*actuator means comprising second elongated strip means having formed thereon and along the length thereof a row of raised areas spaced apart said given distance;*

*said actuator means being supported by said elongated base portion and said first elongated strip means to have its said row of raised areas matably engaged with said first row of inclined surfaces;*

*said actuator means further constructed to be moveable longitudinally along its length to cause the said inclined surfaces to ride up and down said raised areas to move the external terminal engaging portions of said contacts transversely to the longitudinal movement of said actuator means.*

*24. A zero entry force connector as in claim 23 in which said row of raised areas comprise a second row of inclined surfaces similar to the inclined surfaces of said first row of inclined surfaces and matably engageable with said first row of inclined surfaces.*

* * * * *